US009646408B2

(12) United States Patent
Johnson et al.

(10) Patent No.: US 9,646,408 B2
(45) Date of Patent: May 9, 2017

(54) METHODS AND SYSTEMS FOR GENERATING A THREE DIMENSIONAL REPRESENTATION OF A SUBJECT

(71) Applicant: Kabushiki Kaisha Toshiba, Minato-ku (JP)

(72) Inventors: Sam Johnson, Cambridge (GB); Frank Perbet, Cambridge (GB); Bjorn Stenger, Cambridge (GB); Minh-Tri Pham, Cambridge (GB); Oliver Woodford, Cambridge (GB); Riccardo Gherardi, Cambridge (GB); Roberto Cipolla, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 392 days.

(21) Appl. No.: 14/270,427

(22) Filed: May 6, 2014

(65) Prior Publication Data

US 2014/0375635 A1 Dec. 25, 2014

(30) Foreign Application Priority Data

Jun. 21, 2013 (GB) .................................. 1311117.4

(51) Int. Cl.
  *G06T 15/00* (2011.01)
  *G06T 17/20* (2006.01)
(52) U.S. Cl.
  CPC .............. *G06T 15/00* (2013.01); *G06T 17/20* (2013.01)
(58) Field of Classification Search
  CPC ................................ G06T 17/20; G06T 15/00
  (Continued)

(56) References Cited

U.S. PATENT DOCUMENTS 6,847,371 B2 * 1/2005 Matsumoto ............. G06T 15/04
  345/582
7,158,656 B2 * 1/2007 Covell ............... G06K 9/00369
  348/139

(Continued)

FOREIGN PATENT DOCUMENTS

JP     2006-59143      3/2006
WO  WO 2012/075298 A2  6/2012

OTHER PUBLICATIONS

Kazemi V, Keskin C, Taylor J, Kohli P, Izadi S. Real-time face reconstruction from a single depth image. In2014 2nd International Conference on 3D Vision Dec. 8, 2014 (vol. 1, pp. 369-376). IEEE.*

(Continued)

*Primary Examiner* — Phu K Nguyen
(74) *Attorney, Agent, or Firm* — Oblon, McClelland, Maier & Neustadt, L.L.P.

(57) ABSTRACT

According to one embodiment, a method of generating a three dimensional representation of a subject from a depth image, comprises comparing a depth image of the subject with a plurality of representative images, wherein each representative image is associated with a respective parametric model of a subject; identifying a representative image of the plurality of representative images as a closest representative image to the depth image of the subject; selecting the parametric model associated with the closest representative image to the depth image; and generating a three dimensional representation of the subject by fitting the selected parametric model to the depth image of the subject.

20 Claims, 6 Drawing Sheets

(58) Field of Classification Search
USPC .................................... 345/419, 420, 422
See application file for complete search history.

(56) References Cited

U.S. PATENT DOCUMENTS

| | | | | |
|---|---|---|---|---|
| 8,781,217 | B2* | 7/2014 | Gurman | G06K 9/00201 345/419 |
| 8,824,737 | B2* | 9/2014 | Gurman | G06K 9/00201 382/103 |
| 9,189,886 | B2* | 11/2015 | Black | G06K 9/00369 |
| 9,393,697 | B1* | 7/2016 | Beardsley | B25J 11/0005 |
| 2001/0005204 | A1 | 6/2001 | Matsumoto et al. | |
| 2010/0328307 | A1 | 12/2010 | Lim | |
| 2011/0069866 | A1 | 3/2011 | Kim et al. | |
| 2011/0109724 | A1 | 5/2011 | Mathe et al. | |

OTHER PUBLICATIONS

Pons-Moll12, Gerard, Jonathan Taylor13, Jamie Shotton, Aaron Hertzmann14, and Andrew Fitzgibbon. "Metric regression forests for human pose estimation." (2013).*

Extended European Search Report issued Dec. 2, 2014 in Patent Application No. 14166905.1.

Mao Ye, et al., "Accurate 3D pose estimation from a single depth image" 2011 IEEE International Conference on Computer Vision, XP002732593, 2011, pp. 731-738.

Stefan Hauswiesner, et al., "Free viewpoint virtual try-on with commodity depth cameras" VRCAI 2011, XP002732594, Dec. 11, 2011, pp. 23-30.

L. Kavan, et al., "Fast and efficient skinning of animated meshes" EUROGRAPHICS 2010, vol. 29, No. 2, XP002732595, 2010, 10 Pages.

United Kingdom Search Report issued Dec. 24, 2013 in GB application 1311117.4, filed on Jun. 21, 2013.

Alexander Weiss et al. "Home 3D Body Scans from Noisy Image and Range Data", 2011 IEEE International Conference on Computer Vision (ICCV), 2011, 8 pages.

"[TC]² Announces Major Breakthrough in 3D Full Body Scanning", Press Release dated Feb. 29, 2012, 3 pages.

Office Action issued Jul. 7, 2015 in Japanese Patent Application No. 2014-121707 (with English translation).

* cited by examiner

METHODS AND SYSTEMS FOR GENERATING A THREE DIMENSIONAL REPRESENTATION OF A SUBJECT

CROSS REFERENCE TO RELATED APPLICATION

This application is based upon and claims priority from United Kingdom Patent application number GB1311117.4 filed 21 Jun. 2013; the entire contents of which are incorporated herein by reference.

FIELD

Embodiments described herein relate generally to the generation of a three dimensional representation of a subject, such as a human, from a depth image.

BACKGROUND

The estimation of human body shape has a wide variety of applications, from medical to commercial domains. In medicine for example it may be possible to visualise future changes to a 3-D body to encourage lifestyle change. In the commercial domain accurate capture of nude body shape would allow virtual fitting; visualisation of the customer in different clothing. They key to these applications seeing wide deployment is in the usability of any body shape estimation system. In such systems it is advantageous if the three dimensional representation is quickly generated. Further it is advantageous if the requirement for an operator to manually place markers is removed.

BRIEF DESCRIPTION OF THE DRAWINGS

In the following, embodiments are described, by way of example only, with reference to the accompanying drawings in which.

DETAILED DESCRIPTION

According to one embodiment a method of generating a three dimensional representation of a subject from a depth image comprises comparing a depth image of the subject with a plurality of representative images, wherein each representative image is associated with a respective parametric model of a subject; identifying a representative image of the plurality of representative images as a closest representative image to the depth image of the subject; selecting the parametric model associated with the closest representative image to the depth image; and generating a three dimensional representation of the subject by fitting the selected parametric model to the depth image of the subject.

In an embodiment fitting the selected parametric model to the depth image of the subject comprises minimising an energy function, wherein the energy function comprises a distance term which depends on the distance between points on the depth image of the subject and corresponding points on the selected parametric model.

In an embodiment the distance term gives a preference to points on the model being inside a volume defined by points on the depth image.

In an embodiment the distance term comprises a gravity function dependant on the normal to a surface of the selected model and a gravity direction.

In an embodiment each representative image is a depth image calculated from the respective parametric model.

In an embodiment each representative image is a weighted combination of a depth image and an alpha image calculated from the respective parametric model.

In an embodiment the method further comprises normalising the orientation of the subject and/or the depth of the subject in the depth image before comparing the depth image of the subject with the plurality of representative images.

In an embodiment the method further comprises reducing the resolution of the depth image before comparing the depth image of the subject with the plurality of representative images.

In an embodiment the method further comprises calculating a size indicator and/or a measurement of the subject from the three dimensional representation.

In one embodiment a system for generating a three dimensional representation of a subject from a depth image comprises storage for a plurality of parametric models of the subject and a plurality of representative images, each representative image being associated with a respective parametric model; a selection module operable to compare the depth image of the subject with each of the plurality of representative images; identify a representative image of the plurality of representative images as a closest representative image to the depth image of the subject; and select the parametric model associated with the closest representative image to the depth image; and a fitting module operable to generate a three dimensional representation of the subject by fitting the selected parametric model to the depth image of the subject.

In an embodiment the fitting module is operable to fit the selected parametric model to the depth image of the subject by minimising an energy function, wherein the energy function comprises a distance term which depends on the distance between points on the depth image of the subject and corresponding points on the selected parametric model.

In an embodiment the distance term gives a preference to points on the model being inside a volume defined by points on the depth image.

In an embodiment the distance term comprises a gravity function dependant on the normal to a surface of the selected model and a gravity direction.

In an embodiment each representative image is a depth image calculated from the respective parametric model.

In an embodiment each representative image is a weighted combination of a depth image and an alpha image calculated from the respective parametric model.

In an embodiment each representative image as a resolution of less than 100×100 pixels.

In an embodiment the selection module is operable to normalise the orientation of the subject and/or the depth of the subject in the depth image before comparing the depth image of the subject with the plurality of representative images.

In an embodiment the system is further operable to calculate a size indicator and/or a measurement of the subject from the three dimensional representation.

In an embodiment the system comprises a depth image capture device configured to capture the depth image of the subject.

One embodiment provides a computer program product comprising computer executable instructions which, when executed by a processor, cause the processor to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Figure 1:
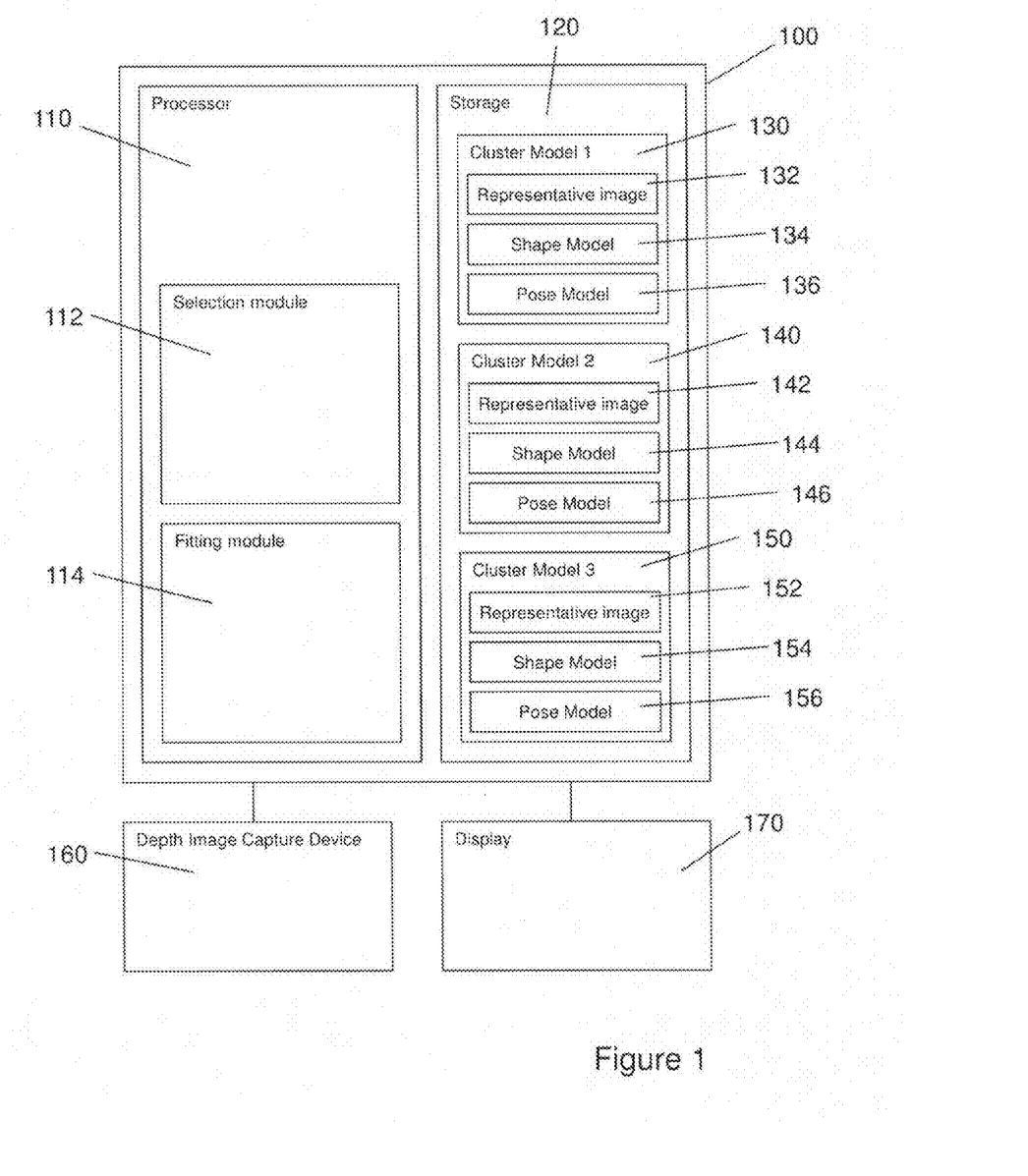
FIG. 1 shows a system for generating a three dimensional representation of a subject.

FIG. 1 shows a system for generating a three dimensional representation of a subject according to an embodiment. The system 100 comprises a processor 110 and storage 120. The processor 110 comprises a selection module 112 and a fitting module 114. The storage 120 stores a plurality of cluster models. In the example shown in FIG. 1, the storage stores three cluster models. A first cluster model, Cluster model 1 130 comprises a representative image 132, a shape model 134 and a pose model 136. A second cluster model, Cluster model 2 140 comprises a representative image 142, a shape model 144 and a pose model 146. A third cluster model, Cluster model 3 150 comprises a representative image 152, a shape model 154 and a pose model 156.

The system 100 is coupled to a depth image capture device 160 and a display 170. The system may also comprise a camera. The camera may be integrated with the depth image capture device or may be a separate device.

The cluster models 130, 140 & 150 are models for the shape and pose of a human subject. The cluster models 130, 140, & 150 are parametric models, that is, they include numerical variables which can be varied to make the models fit a depth image of a subject. Each of the cluster models 130, 140 & 150 corresponds to a cluster of possible shapes and poses for human subjects. The representative images 132, 142 & 152 are images which are calculated from cluster mean for the respective cluster model.

In an embodiment, the representative images are depth images. In an alternative embodiment, the representative images are alpha images or silhouettes. In an embodiment the representative images are weighted combinations of depth images and alpha images.

In an embodiment the resolution of the representative images is low, for example less than 100 pixels by 100 pixels. The use of a low resolution representative images increases the efficiency of the matching.

The selection module 112 and the fitting module 114 are computer program modules. They may be implemented as computer software running on a general purpose processor or may be specifically programmed hardware modules or a combination of the two.

Figure 2:
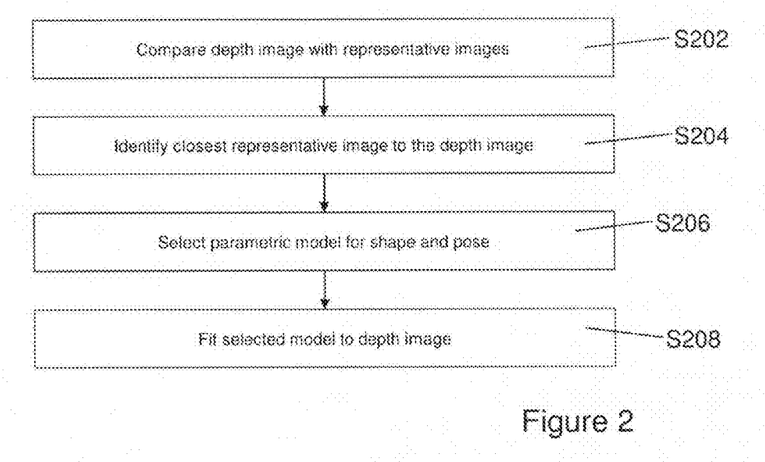
FIG. 2 shows a method of generating a three dimensional representation of a subject.

FIG. 2 shows a method of generating a three dimensional representation of a subject from a depth image which is executed by the selection module 112 and the fitting module 114 on the processor 110.

The depth image may be captured by the depth image capture device 160. Alternatively, the method may be carried out on a depth image transferred to the system 100 either over a network or on a storage medium.

The method may be started using a manual trigger such as button or a remote control. Alternatively, the method may be triggered by a voice or gesture command.

The method may be automatically triggered in different ways. If a person is detected standing in a particular area the method may be automatically triggered. This detection may be as a result of a detection from the depth image capture device, or by a detection from a separate sensor located on the floor. Alternatively, the method may be triggered if a person is detected as being within the statistical space of pose and shape regardless of their location in the real world. For example, if the system assesses that it can provide a good body shape estimate the method will be triggered.

In step S202, the depth image is compared with each of the representative images 132, 142 & 152. In step S204, the closest representative image to the depth image is identified. In step S206, the parametric models for shape and pose corresponding to the closest representative image are selected. In step S208, the selected models are fitted to the depth image. The shape model which has been fitted to the subject is taken as the three dimensional representation of the subject.

In an embodiment the depth image is normalised before it is compared with the representative image. The normalisation may include adjusting the orientation of the subject in the depth image so that a front plane of the subject is parallel to the image plane. The normalisation may also include normalising the depth of the plane of the front of the subject.

In an embodiment the input depth image is altered in two ways. First, it is rotated and translated from the world to the front plane of the user. Second, the depth is blurred and subsampled for efficiency purposes.

In an embodiment in which the representative image is a weighted combination of a depth image an a silhouette, the input depth is altered in three ways. First, it is rotated and translated from the world to the front plane of the user. Second, the depth along with the corresponding silhouette is blurred and subsampled for efficiency purpose. Third depth and silhouette re-weighted to match the weighting of the weighted combination of depth image and silhouette which form the representative image.

The output of the system may be a 3D data file including a set of locations in three dimensions and a mesh definition.

In an embodiment, the system is configured to calculate measurements of the subject. The measurements may be discrete sizes, for example, small, medium and large or measurements such as waist or inside leg of the subject.

The display 170 may be configured to display a three dimensional representation of the subject. The display may also be configured to display the results of calculated measurements for the subject.

In an embodiment the display is configured to display a visualisation of the subject wearing an item of clothing without the need for them to try on the actual product.

In the method described above, the estimation of the pose and shape of a person is treated as a registration problem. A previously learnt model of shape and pose is fitted to a depth image. This model allows efficient registration to any plausible human body shape in a range of poses.

In the following a method of creating the cluster models discussed above is described and embodiments of methods of generating a three dimensional representation of a subject are described. The approach described below focuses on efficiency and the model is inspired by character meshes used in the computer graphics field. Separate models of pose and body shape are learned and the body shapes are morphed into a specific pose using Linear Blend Skinning (LBS).

In order to learn such models a dataset containing many 3-D humans in widely varying shapes and poses in full correspondence is required.

Figure 3:
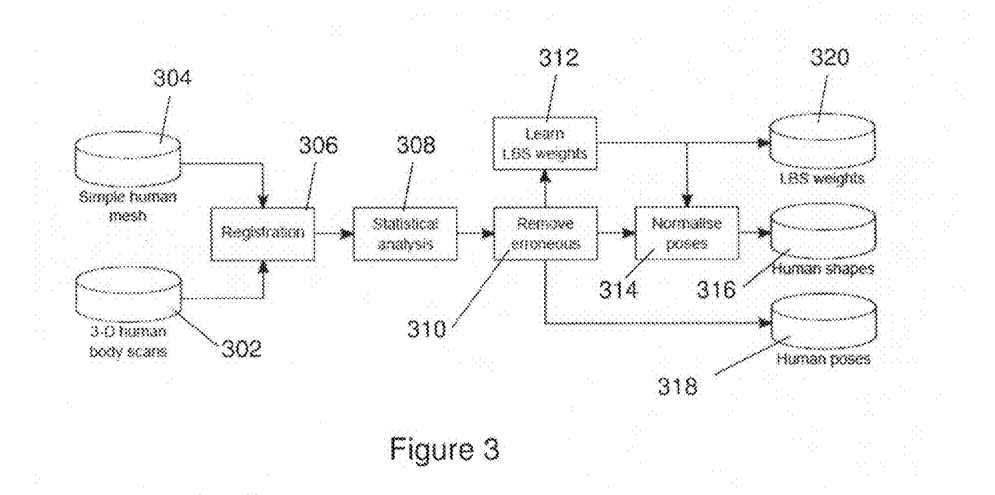
FIG. 3 shows a method of generating three dimensional scan data.

FIG. 3 shows an outline of a method used to create such a dataset. The method shown in FIG. 3 was used since a single dataset was not available.

The inputs to the method are 3-D human body scans 302 and a simple human mesh 304. For the 3-D human scans, a database of scans of various humans in a range of poses is used. To create a dataset which can be used to learn a model of shape and pose, the approach illustrated in FIG. 3 was taken.

As the human mesh model 304, an instantiation of a generalised 3-D cube model which is called in the following description CubeMesh was used. The CubeMesh model was then fitted to a given human scan in a course-to-fine process.

Figure 4A:
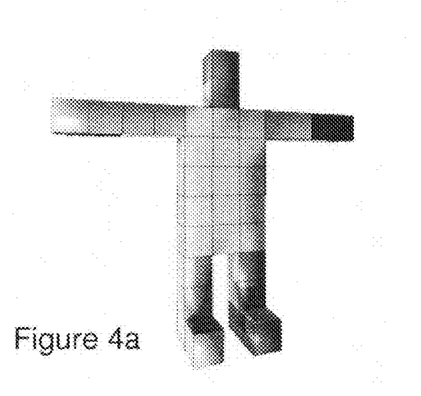
FIGS. 4*a-d* show multi-resolution models of a human subject.

FIG. 4a shows a CubeMesh model of a human subject. This model allows a simple 'sketch' of the 3-D form of an object class to be constructed using cubes, with each assigned various semantic and structural information.

Figure 4B:
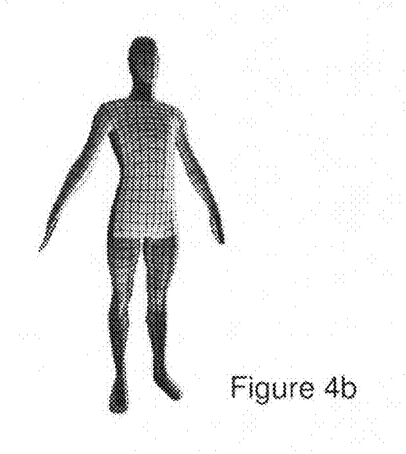
Figure 4C:
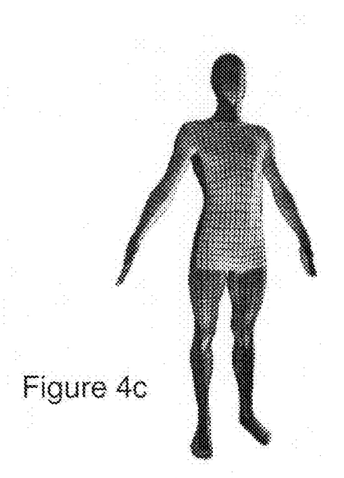
Figure 4D:
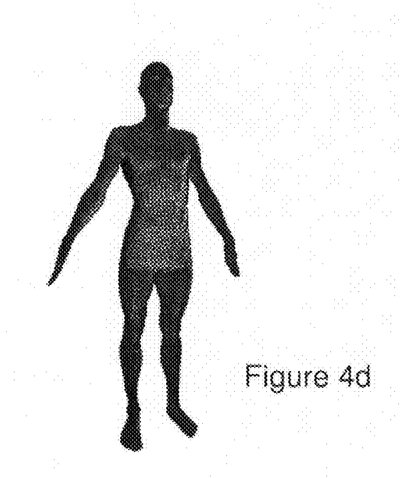

FIGS. 4b to 4d show human mesh models going from low resolution to high resolution.

The initially geometrically coarse model can then be subdivided to an arbitrary resolution per cube. While any subdivided mesh is useful in terms of application of the model, it is possible to parametrically define operations in a continuous manner on the original cubes. For example, this allows the specification of points, or sections on each cube without discretising to specific vertex locations of the subdivided mesh. In the case of registering human meshes this property allows the specification of a deterministic routine for generating a human skeleton from any given registered mesh.

The CubeMesh model allows the specification of a rough cube based 'sketch' of a 3-D object class such as a human as shown in FIG. 4a. This model is then fitted to a given human scan in a coarse-to-fine process as shown in FIGS. 4b to 4d while retaining semantic information about each patch. The model also allows the easy specification of deterministic structural algorithms with continuous parameters on the original cubes and the translation of this to the high resolution registered models. This process is used to recover a skeleton for each registered mesh.

In a registration step 306 the human CubeMesh is registered to each 3-D scan in the input dataset of scans of various humans in a range of poses. To reduce computation time the registration is performed with a coarse to fine strategy. The process begins with the coarsest representation of the mesh and involves repeatedly fitting then increasing the resolution of the CubeMesh. For each resolution, the solution is found by minimizing a cost function using a standard gradient descent approach. The cost function is a linear combination of three terms: a smoothness term (the curvature must be low), a data term (the CubeMesh must be close to the scan) and a landmark term (known landmarks must be close). The continuous parameterisation of the CubeMesh model is utilised to add the landmark points corresponding to real-world markers present on each scanned human.

In step 308 statistical analysis is performed on the registration results. The purpose of the statistical analysis is to identify any outliers. The results of the statistical analysis were used to remove registrations which are erroneous. For example, the underside of the arm might be missing due to an error in acquiring the scan. In step 310 erroneous scans are removed from the dataset.

In step 312 Linear Blend Skinning (LBS) weights are learned. From the registered meshes LBS weights are learned which allow the inversion of the skinning process and each mesh to be morphed into a standard pose. A single set of learnt LBS weights and each pose and normalised body shape are stored.

In step 314 the pose of the scans is normalised. The pose of a body scan is given implicitly through the registration, since for any given mesh there is a deterministic algorithm to give the underlying skeleton. More challenging is recovery of the true body shape without pose. To do this a standard canonical pose must be selected. The mean pose from the input dataset of scans of various humans in a range of poses, shown in FIG. 4 is used as the standard canonical pose.

Morphing the registered mesh into the standard pose is achieved using Inverse Linear Blend Skinning (ILBS)—an inversion of the skinning process to recover a dress shape from a morphed, skinned shape. Linear Blend Skinning (LBS) is a technique used in the computer graphics community for efficient character animation.

The skinned or morphed location of each vertex $v_s$ is computed as a weighted sum of the n skeletal bone transformations $M_b$ applied to the 'dress pose' vertex location $\bar{v}$, as follows:

$$v_s = \sum_{b=1}^{n} w_b M_b \overline{M_b}^{-1} \bar{v}$$

In the above equation $w_b$ is a weight representing the influence that the bone b has on the vertex $v_s$ and b is an index. The matrix $\overline{M_b}^{-1}$ represents the inverse 'dress pose' skeletal bone transformation. From right to left, the left hand side of the above equation represents taking the 'dress pose' vertex location, transforming it into the co-ordinate system of bone b in the dress pose and then transforming it by the pose transformation of bone b.

The weights $w_b$ are learned using the entire set of registered meshes. The global set of dress vertex locations is then discarded.

To learn a parametric model of 3-D human body shape alone requires removal of any pose variation between training examples.

Figure 5A:
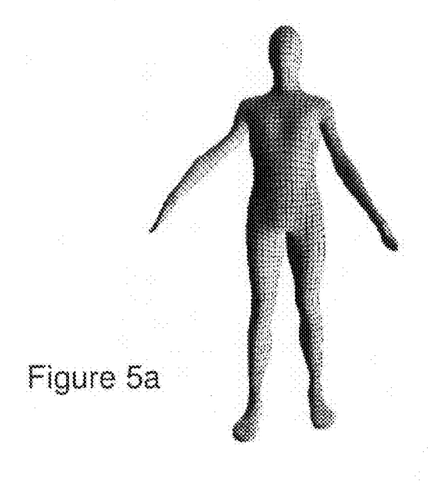
FIGS. 5*a-d* show the separation of shape and pose for preparing models of a human subject.
Figure 5B:
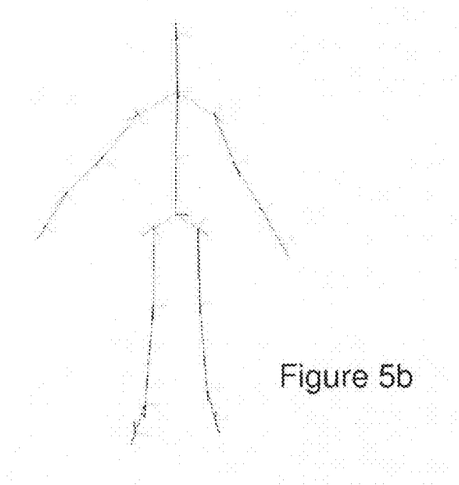
Figure 5C:
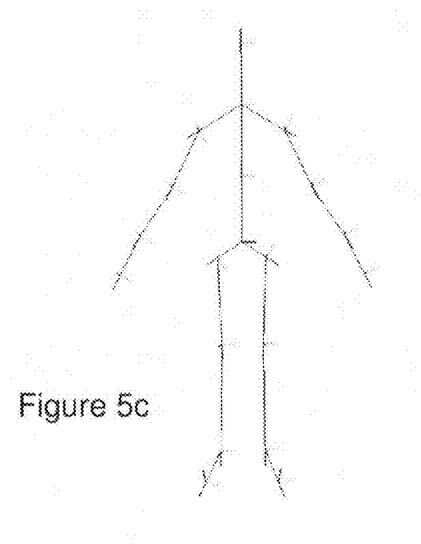
Figure 5D:
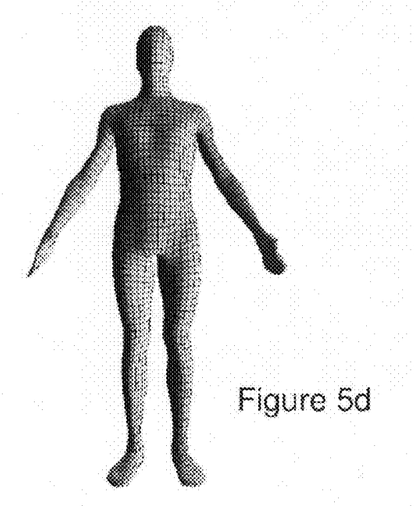

FIG. 5a shows a registered human mesh in a posed shape. FIG. 5b shows a skeleton in the pose of the mesh in FIG. 5a. FIG. 5c shows a skeleton in a normalised pose or 'dress pose'. FIG. 5d shows the body shape of the registered mesh of FIG. 5a transformed to the dress pose.

Given the posed, registered meshes (such as in FIG. 5a), the set of dress pose vertices specific to each particular posed mesh (FIG. 5d) is determined. To do so the LBS process is inverted. For each vertex v the complete transformation matrix T from dress vertex location v to $v_s$ is computed:

$$T = \sum_{b=1}^{n} w_b M_b \overline{M}_b^{-1}$$

This allows the dress or posed normalised vertex location to be calculated in each registered mesh as:

$$\overline{v} = T^{-1} v_s$$

The techniques described above allow body shapes to be separated from their poses in a dataset of 3-D human scans. This results in two datasets, one consisting of body shapes 316 in a standard pose and the other consisting of poses 318. This allows separate statistical models of each to be built and estimated each independently. A single set of LBS weights 320 is also stored.

In the approaches described herein the dataset is partitioned and statistical models are learned within each region. With this goal in mind it is desirable to generate extra data in regions of the pose and shape space for which there are very few examples. The techniques discussed above, and the outputs of the human shape, human poses and LBS weights allow the generation of additional samples of posed body shapes.

Figure 6:
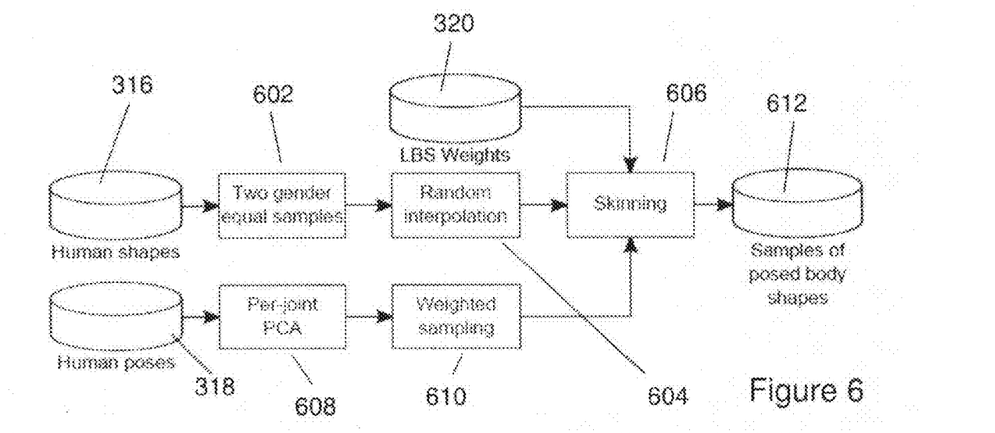
FIG. 6 shows the generation of samples of posed body shapes.

FIG. 6 shows a method of generating samples of posed body shapes. The inputs to the method are the human shapes 316, the human poses 318 and the LBS weights 320 which are calculated using the method shown in FIG. 3.

In step 602 two CubeMeshes of the same gender are sampled. In step 604 the sampled CubeMeshes are randomly interpolated. This new body shape is then skinned 606 to a pose. The pose is created by generating principal component analysis (PCA) for each joint 608, and then sampling a rotation 610 for each joint from the corresponding principal component analysis (PCA) models. This sampling and skinning process is repeated for each required sample in the dataset and takes roughly 1/30 seconds per sample. The output of the method is a set of samples of posed body shapes 612.

As shown in FIG. 6 new shapes are generated using a randomly weighted linear combination of CubeMeshes in the standard canonical pose. This simple linear combination almost always gives human-looking result, regardless of how distant the interpolated body shapes are. In step 602 samples of the same gender were used as interpolating shapes of different gender was found to give distinctively unrealistic results.

Modelling the appearance of an entire range of human poses is a challenging task due to the degree of articulation present. Given the allowable range of movement of each of the 13 major joints alone the space of possible poses is extremely large, this is without even considering finger movement. As such we would like to be able to define the space of poses for which we create a dataset. This is achieved by learning a parametric model of pose using principal component analysis (PCA) on the relative 3-D orientations of each joint and weighted sampling from this model.

The angles of each joint relative to their parent are represented using exponential maps, a representation of 3-D rotation by a vector in $R^3$. This vector describes the rotation axis and the angle of rotation around that axis. Such a parameterisation is used as it allows a compact representation of 3-D rotation while allowing the use of statistical analysis methods. For each joint the relative transformation from parent to child bone is computed and then the exponential map of the rotation is computed. Then PCA is separately performed on the set of exponential maps for each joint in all example poses. To sample a novel pose, a relative rotation is sampled for each joint in the skeleton. Control of the pose space is enabled by weighting the variances used to sample from each dimension of the per-joint PCA model. These weights are set by hand after visual inspection of the range of movements to which each principal component corresponds.

The pose and shape model takes the form of two separate PCA models which are combined with LBS. Given a database of body shape meshes with the same topology, and starting on the origin, the x; y; z locations of all vertices are vectorised and concatenated. Then PCA is performed on this set of vectors for all meshes. The model of pose is computed as above with a PCA model computed for each of the 19 joints of our skeleton. An alternative to this approach is to compute a PCA model over all joint parameters concatenated into a single vector. In practice it was found that the per-joint models offer a greater degree of generalisation to unseen poses during the fitting stage. Given a location in the parameter space of the pose and shape models final meshed output using LBS with the weights computed during training.

For the purpose of efficient fitting, it is advantageous if the space of shape and pose to be well localised to a given initialisation and thus more compact. This reduces the parameter space in which is optimised, leading to increased efficiency. Furthermore it helps regularisation of the optimised parameters to keep the hypothesised pose and shape close to the point of initialisation. To achieve such localisation pose and shape are jointly clustered through the space of simulated depth camera measurements.

Figure 7:
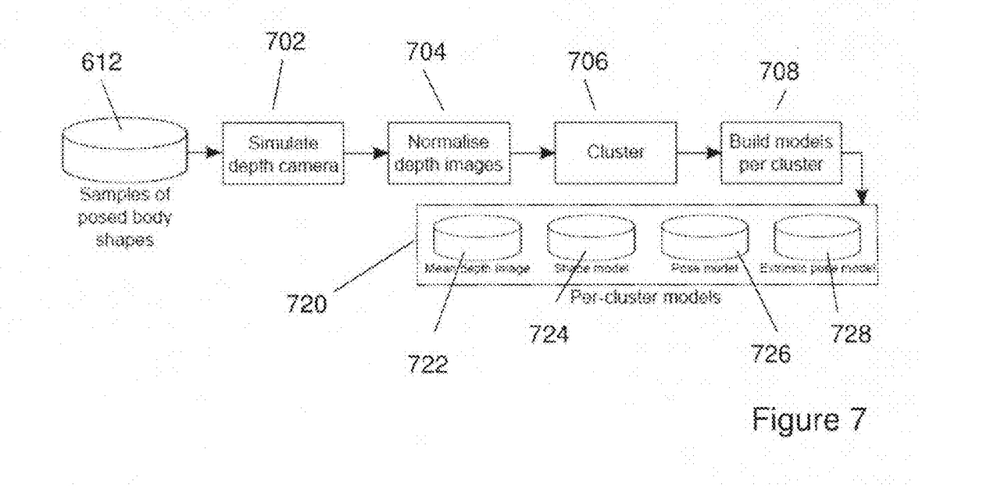
FIG. 7 shows the generation of cluster models of a subject.

FIG. 7 shows a method of learning local models of shape and pose. The efficiency and robustness of the fitting process lies in a fast initial approximation and a restricted model of pose and shape for the gradient descent stage. This is achieved by clustering in the space of simulated depth images, which are rendered for each sample in the posed body shape database 612. In the fitting process we first match the input image to the cluster centroids and then use the corresponding models of pose and shape for an iterative closest point based registration.

In step 702, depth images are synthesised from the samples of posed body shapes 612. In step 704, the depth images are normalised.

The normalisation is carried out to reduce the space of possible measurement images. This achieves two key goals: (i) removal of distracting background information to leave just the present human, (ii) normalisation of orientation and distance with respect to the sensor.

The human is segmented from the background using a region growing method. The region with a pixel at the centre of where the human is expected to be is seeded. Pixels are iteratively added until reaching a boundary in the depth image which is larger than a given threshold.

The orientation is normalised orientation by fitting a plane to the 3-D foreground points, allowing rotation only around the vertical axis. The translation of the segmented human is normalised by removing the mean of all segmented points. Using the discovered transforms allows a normalised orthographic re-projection of the original measurement image. The effect of this is that the depth image is rotated and translated to the normalisation plane In step 706 the normalised depth images are clustered. To cluster the large number of normalised measurement images k-means clustering is used. The measurement images are first prepared by decreasing the size to an arbitrarily small scale. FIG. 8 shows measurement images reduced to just 16 by 16 pixels. This reduction in size increases the efficiency of both training and testing processes. Due to this reduction an alpha map is computed along with each small depth image. This alpha map represents the confidence in each depth pixel value, i.e. the number of valid higher resolution measurement pixels which contributed. The alpha image may be considered to represent a silhouette of the human subject. The alpha image is created by blurring and subsampling the full resolution binary silhouette image—i.e. reducing the resolution.

The depth plus alpha images are then weighted and vectorised and form the feature vector for a sample. The weighting allows the belief to be adjusted between clustering based only on silhouette, or on silhouette plus depth. It was found that even at this small scale the majority of body shape and pose changes are captured.

In step 708 local models 720 are built for each cluster. The local models are built using in the form of two separate PCA models which are combined with LBS in the same manner as described above in relation to the global models. Each local model comprises a mean depth image 722, a shape model 724, a pose model 726 and an extrinsic pose model. The mean depth image 722, may, as described above, be a weighted combination of an alpha image and a depth image. The extrinsic pose model 728 models the location of a posed human shape in the co-ordinate frame of the normalisation plane. This aids in overcoming localisation error in the normalisation which, operating on the measurement image, is dependent on body shape and pose.

Figure 8A:
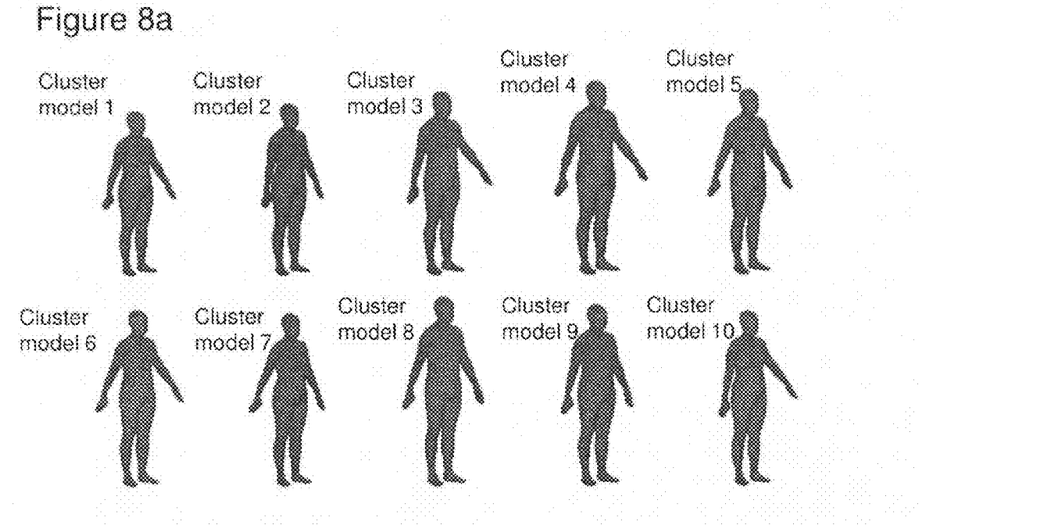
FIG. 8*a* shows cluster models of a human subject.
Figure 8B:
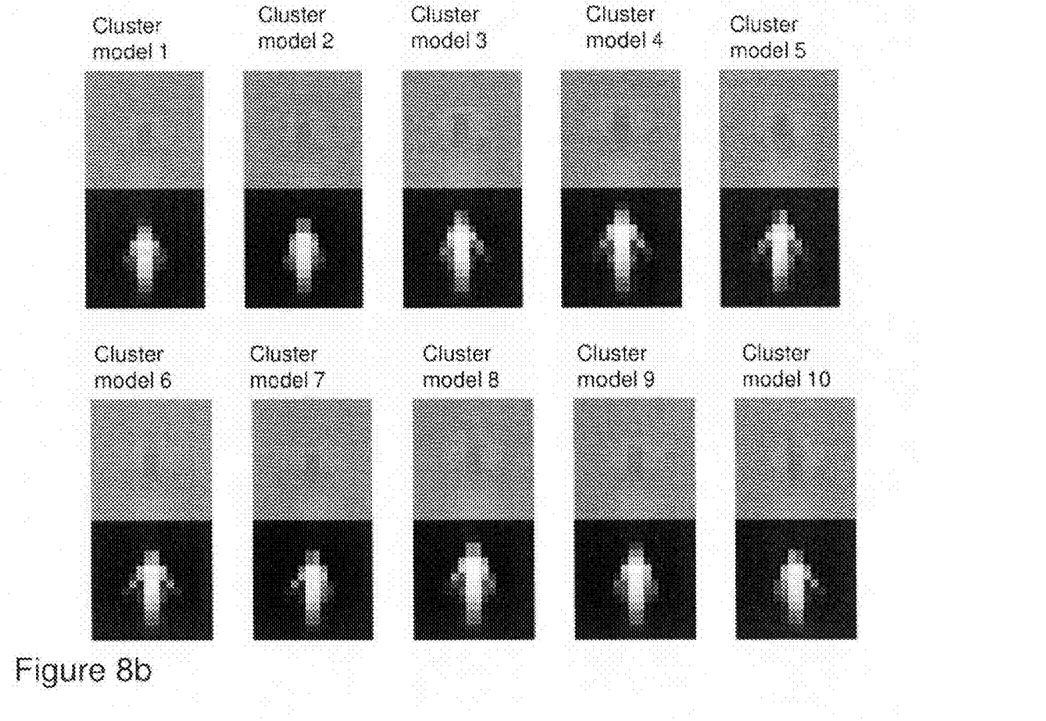
FIG. 8*b* shows representative images corresponding to the cluster models shown in FIG. 8*a*.

FIG. 8a shows examples of cluster centroid meshes and FIG. 8b shows corresponding cluster centroid depth and alpha images.

FIG. 8a shows the cluster centroid meshes for 10 cluster models these are labelled as cluster model 1 to cluster model 10. As can be seen in FIG. 8a each cluster has a different shape and/or pose.

FIG. 8b shows the representative images for each of the cluster models shown in FIG. 8a. Each cluster is represented by the measurement image rendered from the means of the pose and shape models. As can be seen in FIG. 8b, the images are greatly reduced in size to increase efficiency. Due to the reduction in size both depth measurement and alpha values are computed for each pixel. The alpha values indicate the degree of valid information present.

The process of estimating the body shape of a human from a depth image using the cluster models 720 shown in FIG. 7 will now be described. The method described below corresponds to an example of the method shown in FIG. 2.

Given an unseen input depth image, the body shape of any present human is estimated without distraction from possibly heavy clothing. This is achieved, given the models learnt above, in a two stage process. First a non-parametric estimate is performed by comparison with all cluster representative images. The corresponding models of shape, pose, and normalisation error are then used in a second, gradient descent stage to reach an accurate registration.

Before fitting can begin we require an accurate estimate of the floor location. This enables correct placement of the feet and is important for accurate normalisation of human orientation towards the camera.

In an embodiment the depth sensor used provides a gravity vector through use of an accelerometer. It is assumed that the floor in any scene is roughly perpendicular to this vector. As such fitting of a floor plane can be achieved by projecting all 3-D points in the scene onto this vector and finding the point of maximum density. The resulting floor location is refined using a simple Iterative Closest Point (ICP) style algorithm to account for error in the accelerometer measurements.

When the system is triggered the normalisation process described above is performed. This gives a depth measurement normalised in the same way as the synthesised depth measurements were during the training phase. An exhaustive nearest neighbour comparison is performed under the Euclidean distance to all cluster centroids, weighting the depth and alpha images by the same weights used during training. The closest cluster contains models for pose, shape and normalisation error with the means being a close initial approximation of the true body shape.

Given the computed initialisation and constrained models of pose, shape and normalisation error, the Cube-Mesh is fitted to the input point cloud of the depth image using the iterative Levenberg-Marquardt algorithm. Registration is performed with repeated iterations of three processes in which the mesh shape, intrinsic (articulated) pose, and extrinsic pose (accounting for normalisation error) are fitted independently. At each high-level stage of the optimisation mesh to point cloud correspondences are determined, and then the model is updated to minimise the following energy function:

$$E(X) = E_d(X) + \alpha E_v(X) + \beta E_f(X) + \gamma E_r(X)$$

Where $X = (X_s, X_p, X_t)$ are the parameters for the shape, pose and normalisation error models respectively. The terms of the energy function capture the distance between corresponding points, $E_d$, the geometric volume of the registered mesh, $E_v$, a penalty for lifting the feet too far from the ground, $E_f$, and a regularisation term over the elements of X, $E_r$. Each term is described in further detail below, along with a robust method for correspondence finding with respect to normal direction, $n = (x, y, z)$. $\alpha$, $\beta$, and $\gamma$ are coefficients which are determined during the training of the model.

The distance term, which is the data term, encourages the model mesh to be close to the input point cloud:

$$E_d = \Sigma K(d(p_i, q_i)/\sigma)$$

where $p_i = (x, y, z)$ and $q_i = (x, y, z)$ are corresponding pairs of data and model vertices, $d(..)$ is a distance function, $\sigma$ is the noise level and K a is kernel function.

The distance function $d(..)$ is crafted to handled the presence of cloth. It is a modified point to point distance.

$$d(p, q) = \text{gravity}(\text{inside}(<p-q, n_q>), n_q)$$

Where $n_q$ the normal at point q, the function inside(..) of a variable y is given by $$\text{inside}(y) = y \cdot (1 + \delta(y<0) \tau_{inside})$$

The inside(..) function gives a preference for the model to be within the clothed shape. That is, the naked shape is within the clothed shape.

The gravity function is given by $$\text{gravity}(y, n) = y \cdot (1 + \max(0, N_y) \cdot \tau_{gravity})$$

Where $N_y$ is the y component of the normal $n = (x, y, z)$. The gravity function imposes a tighter match when the normal is against gravity. This accounts for the fact that clothing is expected to be tight on upwards facing body surfaces. $\tau_{inside}$ and $\tau_{gravity}$ are real valued weights which control the influence of the inside term and gravity term, respectively. The function max(..) is a maximum operator that returns the larger value of its arguments. For example max(a,b) returns the larger value of a and b.

The volume term $E_v$ sets a preference for smaller volumes. This term like the distance term described above is intended to deal with the presence of clothing.

$$E_v = \text{volume}(M(X))^{1/3}$$

Where volume(M(X)) is the volume of the mesh M(X).

The foot term $E_f$ prefers a mesh with feet that are touching the ground. That is the feet are not floating or colliding.

$$E_f = \sum_{feet} \langle q_j, U \rangle$$

where $q_j$ is a model point belonging to the bottom of the right or left foot and U=(0,1,0) is the up vector.

The regularisation term $E_r$ takes into account that PCA models are a good representation of the data for small deviations. In order to keep the results realistic, the regularisation term is used to prefer shapes which are more likely.

$$E_r = \sum \frac{x_i}{\sigma_r}$$

Where $x_i$ are the scalar components of the input parameter vector X and $\sigma_r$ is a threshold influencing what is considered to be normal.

Correspondences between the model and the depth image are calculated with respect to a normal direction. This is because naively computing correspondences leads to poor matches, for example, points on the palm may match to points on the upper side of the hand given an incorrect pose. To overcome this, the correspondences are computed with respect to the normal direction. The smoothed point cloud normals are binned into polar and radial bins by their direction. During the matching stage, the bin index for each model vertex is computed and a point cloud matching vertex in is searched for only the corresponding bin and its neighbours. This ensures that the normals of matching points are similar, and helps overcome initialisation errors in pose.

In an embodiment the methods and systems described above are used in health and body shape monitoring. The impact on a subject of diet or exercise is visualised and assessed. Future body shape may be predicted and assessed. Embodiments allow the visualisation and tracking of a full body shape. This is easier to visualise and may be more motivational than single measures such as waist measurements or weight measurements.

Embodiments have applications in clothing retail. For example, embodiments allow consumers a highly accurate way to visualise clothing. Further, precise and accurate measurements can be taken for made to measure clothing even in an online environment.

Embodiments may be applied to online gaming and communication. Realistic avatars can be created which closely match a subject's body shape. Compression of video including people may be improved since body shape and texture parameters only need to be sent once and the pose could be updated for subsequent times.

Embodiments have applications in tracking people in video sequences. Once a body shape is known, the person having the shape can be tracked in frames of a video sequence and may be re-identified even in sequences captured by a different camera.

Embodiments have applications in biometrics. For example Body shape estimation allows passive access control in office buildings. Body shape combined with other passive biometrics such as gait and posture allow improved identity verification. The ability to estimate body weight passively may be useful flight tickets priced by body weight.

Embodiments have applications in security. Body shape estimation can be used to detect hidden items under clothing. The estimation of body shape and comparison between customers entering and leaving a store can provide shoplifting detection. The estimation and comparison between people at different points in time can detect discrete package drops which is useful in a public security context.

In an embodiment, the system described above is implemented on a Dell Precision T7500 with dual Intel Xeon X5647 processors running at 2.93 GHz and a GeForce GT640 GPU.

While certain embodiments have been described, these embodiments have been presented by way of example only, and are not intended to limit the scope of the inventions. Indeed, the novel methods, and systems described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method of generating a three dimensional representation of the shape of a subject from a depth image, the method comprising
comparing a depth image of the subject with a plurality of representative images, wherein each representative image is associated with a respective parametric model for the shape and pose of a subject, each respective parametric model including numerical variables and the representative images being representations of a mean value of said variables for a cluster of possible shapes and poses of the subject;
identifying a representative image of the plurality of representative images as a closest representative image to the depth image of the subject;
selecting the parametric model for the shape and pose of the subject associated with the closest representative image to the depth image; and
generating a three dimensional representation of the subject by fitting the selected parametric model to the depth image of the subject.

2. The method according to claim 1, wherein fitting the selected parametric model to the depth image of the subject comprises minimising an energy function, wherein the energy function comprises a distance term which depends on the distance between points on the depth image of the subject and corresponding points on the selected parametric model.

3. The method according to claim 2, wherein the distance term gives a preference to points on the model being inside a volume defined by points on the depth image.

4. The method according to claim 2, wherein the distance term comprises a gravity function dependant on the normal to a surface of the selected model and a gravity direction.

5. The method according to claim 1, wherein each representative image is a depth image calculated from the respective parametric model.

6. The method according to claim 1, wherein each representative image is a weighted combination of a depth image and an alpha image calculated from the respective parametric model.

7. The method according to claim 1, further comprising normalising the orientation of the subject and/or the depth of the subject in the depth image before comparing the depth image of the subject with the plurality of representative images.

8. The method according to claim 1, further comprising reducing the resolution of the depth image before comparing the depth image of the subject with the plurality of representative images.

9. The method according to claim 1, further comprising calculating a size indicator and/or a measurement of the subject from the three dimensional representation.

10. A non-transitory computer readable medium carrying processor executable instructions which when executed on a processor cause the processor to carry out the method according to claim 1.

11. A system for generating a three dimensional representation of the shape of a subject from a depth image, the system comprising
storage for a plurality of parametric models for the shape and pose of the subject and a plurality of representative images, each representative image being associated with a respective parametric model, each respective parametric model including numerical variables and the representative images being representations of a mean value of said variables for a cluster of possible shapes and poses of the subject;
a selection module operable to
compare the depth image of the subject with each of the plurality of representative images;
identify a representative image of the plurality of representative images as a closest representative image to the depth image of the subject; and
select the parametric model for the shape and pose of the subject associated with the closest representative image to the depth image; and
a fitting module operable to generate a three dimensional representation of the subject by fitting the selected parametric model to the depth image of the subject.

12. The system according to claim 11, wherein the fitting module is operable to fit the selected parametric model to the depth image of the subject by minimising an energy function, wherein the energy function comprises a distance term which depends on the distance between points on the depth image of the subject and corresponding points on the selected parametric model.

13. The system according to claim 12, wherein the distance term gives a preference to points on the model being inside a volume defined by points on the depth image.

14. The system according to claim 12, wherein the distance term comprises a gravity function dependant on the normal to a surface of the selected model and a gravity direction.

15. The system according to claim 11, wherein each representative image is a depth image calculated from the respective parametric model.

16. The system according to claim 11, wherein each representative image is a weighted combination of a depth image and an alpha image calculated from the respective parametric model.

17. The system according to claim 11, wherein each representative image as a resolution of less than 100×100 pixels.

18. The system according to claim 11, wherein the selection module is operable to normalise the orientation of the subject and/or the depth of the subject in the depth image before comparing the depth image of the subject with the plurality of representative images.

19. The system according to claim 11, being further operable to calculate a size indicator and/or a measurement of the subject from the three dimensional representation.

20. The system according to claim 11, further comprising a depth image capture device configured to capture the depth image of the subject.

* * * * *